US007761062B2

(12) United States Patent
Mervine

(10) Patent No.: US 7,761,062 B2
(45) Date of Patent: Jul. 20, 2010

(54) AUTOMATICALLY MANAGING RENTAL VEHICLES

(75) Inventor: John C. Mervine, Boca Raton, FL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 609 days.

(21) Appl. No.: 11/259,470

(22) Filed: Oct. 26, 2005

(65) Prior Publication Data

US 2007/0093215 A1 Apr. 26, 2007

(51) Int. Cl.
*H04B 1/034* (2006.01)

(52) U.S. Cl. ...................... 455/99; 455/569.2; 455/557; 455/95; 701/211; 701/213; 701/214

(58) Field of Classification Search .................. 455/99, 455/569.2, 557, 95; 701/211, 213, 214
See application file for complete search history.

(56) References Cited

U.S. PATENT DOCUMENTS

| | | | | |
|---|---|---|---|---|
| 6,006,148 | A | 12/1999 | Strong | |
| 6,584,381 | B2 | 6/2003 | Gehrke | |
| 6,584,403 | B2 * | 6/2003 | Bunn | 701/213 |
| 6,728,603 | B2 | 4/2004 | Pruzan et al. | |
| 6,771,981 | B1 * | 8/2004 | Zalewski et al. | 455/557 |
| 6,990,398 | B2 * | 1/2006 | Kinugawa | 701/50 |
| 7,343,306 | B1 * | 3/2008 | Bates et al. | 705/4 |
| 2004/0093155 | A1 * | 5/2004 | Simonds et al. | 701/200 |
| 2005/0096939 | A1 * | 5/2005 | Ramseyer | 705/1 |
| 2006/0155430 | A1 * | 7/2006 | Burgess | 701/1 |
| 2006/0167593 | A1 * | 7/2006 | Eckles | 701/1 |
| 2006/0219776 | A1 * | 10/2006 | Finn | 235/380 |

OTHER PUBLICATIONS

Notification of Transmittal of The International Search Report and The Written Opinion of the International Searching Authority of Application No. PCT/US06/36499, filed Sep. 19, 2006, mailed Sep. 25, 2007 (6 pages).
International Preliminary Report on Patentability, PCT/US2006/036499, May 8, 2008, pp. 1-6.

* cited by examiner

*Primary Examiner*—Sanh D Phu

(57) ABSTRACT

In some embodiments, a method for managing rental vehicles includes associating a mobile device with a rental vehicle. The mobile device is operable to wirelessly receive vehicle information from the associated rental vehicle. Vehicle information is wirelessly received from the mobile device in response to a customer returning the mobile device. A transaction for the customer is automatically generated based, at least in part, on the vehicle information.

13 Claims, 5 Drawing Sheets

AUTOMATICALLY MANAGING RENTAL VEHICLES

TECHNICAL FIELD

This invention relates to object management and, more particularly, to automatically managing rental vehicles.

BACKGROUND

Rental vehicle returns are typically managed by agents with handheld equipment used to scan barcodes and input data. For example, the barcode may identify the specific vehicle and the input data may include mileage, fuel tank level, and condition of the vehicle. Generally, such management relies upon individuals to follow operating and reporting procedures and assumes that the individual accurately inputs necessary information and continually follows all procedures. In addition, the customer is required to wait on the agent until all procedures are followed and data is inputted into the handheld device. The rental company must also provide the necessary personnel and devices to effectively manage returning vehicles.

SUMMARY

In some embodiments, a method for managing rental vehicles includes associating a mobile device with a rental vehicle. The mobile device is operable to wirelessly receive vehicle information from the associated rental vehicle. Vehicle information is wirelessly received from the mobile device in response to a customer returning the mobile device. A transaction for the customer is automatically generated based, at least in part, on the vehicle information.

Implementations may include one or more of the following features. The vehicle information comprises at least one of vehicle identification, vehicle mileage, fuel level, or collision information. The mobile device comprises a key fob. Vehicle information is periodically transmitted to the mobile device in accordance with a time period. A request is transmitted to the wireless device in response to the customer providing the wireless device to a kiosk. A receipt is automatically generated in accordance with the transaction. The receipt is in an electronic format.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
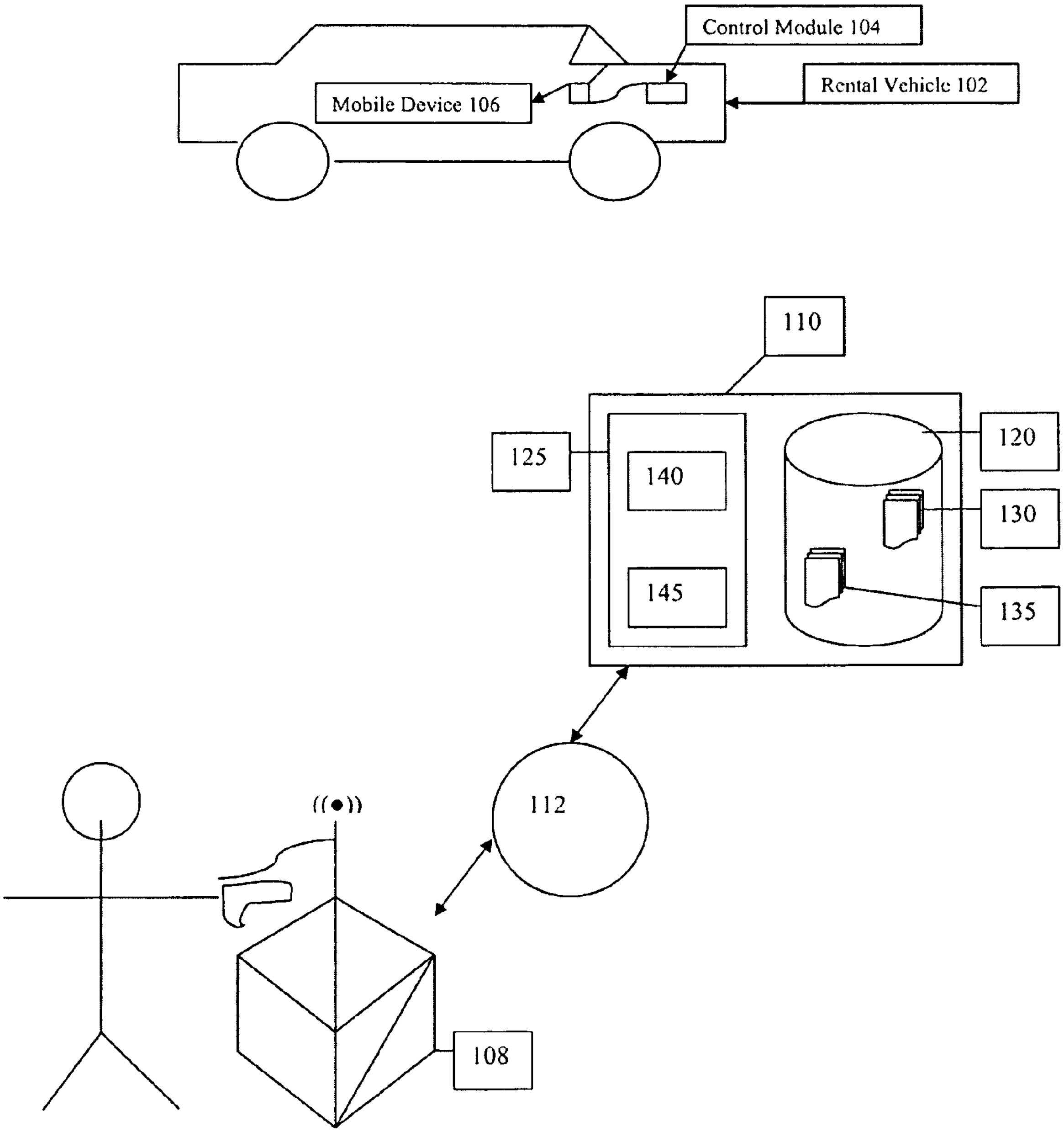
FIG. 1 is an example management system for rental vehicles.

FIG. 1 illustrates an example of a management system 100 for automatically managing rental vehicles. At a high level, system 100 is a distributed environment comprising a vehicle electronic control module 104, a mobile device 106, and a kiosk 108 coupled to a rental system 110 via network 112. In general, system 100 is operable to associate a mobile device with a rental vehicle, wirelessly receive from the mobile device vehicle information, and automatically generate a transaction for a customer based, at least in part, on the vehicle information received from the mobile device. A transaction may include automatically charging the customer for the rental cost, automatically generating a receipt, automatically storing vehicle information in a database, processing data received from the mobile device to generate an electronic record, and/or automatically transmitting the receipt to the customer. Therefore, management system 100 may allow a rental vehicle to be returned without or with minimal contact with an agent. Put another way, management system 100 may enable a transaction to be automatically generated upon return of a rental car using wirelessly receive vehicle information. Conventionally, when returning a rental vehicle, an agent scans a barcode attached to the rental vehicle and inputs into a handle device fuel tank level, mileage, and any indication of a collision. After inputting the information, the agent may then generate a receipt for the use of the rental vehicle. However, processing transactions in this manner requires that the customer wait while the agent collects information and generates a receipt and also requires that the agent and devices are provided in order to collect information and process the transaction. To eliminate or reduce the inconvenience to the customer and the need for agents and devices for handling rental returns, system 100 may automatically generate transactions based on wirelessly received vehicle information.

Rental vehicle 102 can include any vehicle for transporting people are objects such as automobiles, veins, buses, snowmobiles, all-terrain vehicles, said ways, or other such devices. In the illustrated embodiment, vehicle 102 includes control module 104. Control module 104 can include any hardware, software, and/or firmware operable to receive vehicle information from vehicle 102 and wirelessly transmit the vehicle information to mobile device 106. Vehicle information may include mileage, fuel tank level, collision information, or any other suitable information associated with vehicle 102. Control module 104 may transmit a request to the odometer of the vehicle 102 to receive the mileage. Similarly control module 104 may transmit requests to other sensors associated with vehicle 102 such as the fuel tank sensor, collision sensors (e.g., accelerometers), or others. Control module 104 may periodically retrieve vehicle information and/or retrieve the vehicle information in response to an event. For example, control module 104 may retrieve vehicle information in response to turning on or off vehicle 102, being put in park, receiving a wireless or wireline signal, expiration of a rental period, and/or any other suitable event. Upon retrieval of the vehicle information, control module 104 may overwrite previous vehicle information or merge the current vehicle information with previously stored information. After gathering vehicle information, control module 104 may wirelessly transmit vehicle information to mobile device 106. The transmission of the vehicle information may be periodic and/or in response to an event. For example, control module 104 may wirelessly transmit vehicle information in response to turning on or off vehicle 102, vehicle 102 being put in part, receiving a wireless or wireline signal, expiration of a rental period, and/or any other suitable event.

Mobile device 106 can include any hardware, software, and/or firmware operable to receive vehicle information from control module 104 and wirelessly transmit the vehicle information to kiosk 108. For example, mobile device 106 may comprise a fob, a laptop, a Personal Digital Assistant (PDA), a cellular phone, or other portable devices operable to receive wireless signals. Mobile device 106 may receive and transmit infrared signals, radio signals, 802.11, Bluetooth, or other types of signals. In the illustrated embodiment, mobile device 106 comprises a fob (e.g., remote control for keyless access to a vehicle) and will be referred to as fob 106 hereafter. Fob 106 wirelessly receives vehicle information from control module 104 and stores the associated vehicle information. Fob 106 may provide persistent or temporary storage of vehicle information. Fob 106 may overwrite previously stored vehicle information, overwrite at least a portion of the stored vehicle information, or merge current with previously stored information. Typically, fob 106 is a device that may be attached to the key chain associated with rental vehicle 102. In response to an event, fob 106 wirelessly transmits at least a portion of the stored information. For example, fob 106 may transmit the vehicle information in response to receiving a wireless signal from kiosk 108.

Kiosk 108 can include any hardware, software, and/or firmware operable to wirelessly receive vehicle information from fob 106 and transmit the vehicle information to rental system 110. For example, kiosk 108 may include a drop box operable to wirelessly transmit a request to fob 106 for stored vehicle information. Kiosk 108 may include a simple user interface that can be used without training or documentation and may include hardware that is rugged and capable of operating unattended for long periods of time. For example, the interface may indicate when the fob 106 has been detected or what to do in the event when the kiosk 108 does not detect the returned fob 106. Touch screens can provide some of these features because they enable a user to enter and display information on the same device and eliminate the need for keyboards, which are prone to break. In some embodiments, kiosk 108 receives an indication that keys including fob 106 have been left with the kiosk 108. In response to the indication, kiosk 108 may transmit a request and/or retrieve vehicle information from fob 106. After receiving the vehicle information stored by fob 106, kiosk 108 automatically transmits the vehicle information to rental system 110 via network 112 for processing. As a result, kiosk 108 may enable the customer to simply leave the rental car keys in a drop box without requiring the customer to interact with an agent when returning the rental car.

Network 112 facilitates wireless or wireline communication between advertising kiosk 108, rental system 110 and any other local or remote computer. Network 112 encompasses any internal or external network, networks, sub-network, or combination thereof operable to facilitate communications between various computing components in system 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations.

Illustrated rental system 110 includes memory 120 and processor 125 and comprises an electronic computing device operable to receive, transmit, process and store data associated with system 100. For example, rental system 110 may be any computer or processing device such as, for example, a blade server, general-purpose personal computer (PC), Macintosh, workstation, Unix-based computer, or any other suitable device. Generally, FIG. 1 provides merely one example of computers that may be used with the described systems and techniques. For example, although FIG. 1 illustrates one rental system 110 that may be used with the described systems and techniques, rental system 110 can be implemented using other computers, as well as a server pool. Rental system 110 may be adapted to execute any operating system including Linux, UNIX, Windows Server, z/OS or any other suitable operating system. But, servers other than general purpose computers as well as servers without conventional operating systems can be used. According to one embodiment, rental system 110 may also include or be communicably coupled with a web server and/or a data server.

Memory 120 may include any memory or database module and may take the form of volatile or non-volatile memory including, without limitation, magnetic media, optical media, random access memory (RAM), read-only memory (ROM), removable media, or any other suitable local or remote memory component. In this embodiment, illustrated memory 120 stores vehicle profiles 130 and customer profiles 135, but may also include any other appropriate data such as an activity history, print or other reporting files, HTML files or templates, and others. Vehicle profiles 130 include one or more entries or data structures that describes a profile of a rental vehicle 102 and/or a group of rental vehicles 102. For example, a vehicle profile 130 may include, indicate, or reference one or more of the following: a vehicle ID, a vehicle make, a vehicle model, mileage history, fuel tank settings, collision history, rental rates, a vehicle electronic control module ID, a fob ID, a rental location (e.g., street address), and/or any other suitable information associated with rental vehicle 102 and/or group of rental vehicles. Vehicle profiles 130 may be stored in any suitable format such as, for example, an eXtensible Markup Language (XML) document, a flat file, comma separated value (CSV) file, a name-value pair file, SQL table, or others. Indeed, each profile 130 may be a temporary or a persistent data structure. Vehicle profiles 130 are typically generated or loaded based on data or other configuration information received or retrieved from rental vehicle 102 and/or using manually entered configuration information. But vehicle profiles 130 may also be created, updated, or supplied by rental system 110, a third-party software vendor, or any appropriate user of any computer in system 100, loaded from a default profile, or received via network 108.

Customer profiles 135 include one or more entries or data structures that describes a profile of a customer and/or a group of customers. For example, a customer profile 135 may include, indicate, or reference one or more of the following: a customer ID, a driver license's number, a credit card number, insurance information, rental agreement, customer history, customer preferences, rental vehicle ID, home address, home phone number, and/or any other suitable information associated with the customer. In some embodiments, each customer profile 130 is associated with a single individual. Customer profiles 135 may be stored in any suitable format such as, for example, an XML document, a flat file, CSV file, a name-value pair file, SQL table, or others. Indeed, each profile 135 may be a temporary or a persistent data structure. Customer profiles 135 may also be created, updated, or supplied by system 100, a third-party software vendor, or any appropriate user of any computer in system 100, loaded from a default profile, or received via network 108.

System 110 also includes processor 125. Processor 125 executes instructions and manipulates data to perform the operations of server 104 and may be, for example, a central processing unit (CPU), a blade, an application specific integrated circuit (ASIC), or a field-programmable gate array (FPGA). Although FIG. 1 illustrates a single processor 125 in server 104, multiple processors 125 may be used according to particular needs and reference to processor 125 is meant to include multiple processors 125 where applicable. In the illustrated embodiment, processor 125 executes registration engine 140 and transaction engine 145.

The registration engine 140 includes any hardware, software, and/or firmware operable to generate and/or update vehicle profile 130 and customer profile 135. For example, registration engine 140 may receive vehicle information and generate a vehicle profile 130 based, at least in part, on the vehicle information. For example, the registration engine 140 may receive preliminary vehicle information from the rental enterprise to generate the vehicle profile 130. The preliminary vehicle information may include a make, a model, year, a VIN number, a license plate number, a fob ID, initial mileage, or any other suitable information for generating the vehicle profile 130. Upon receiving additional vehicle information from kiosk 108, registration engine 140 updates the vehicle profile 130. In some embodiments, the registration engine 140 receives additional vehicle information including mileage, fuel tank level, and/or collision information from kiosk 108. Using the identifier, the registration engine 140 identifies one or more associated vehicle profiles 130 and updates the associated profiles 130 with the vehicle information. Upon receiving customer information, the registration engine 140 generates one or more customer profiles 135. As discussed above, the customer information may include identification information, billing information, and/or rental agreement information. The registration engine 140 may periodically update the customer profiles 135 in response to certain events. For example, the registration engine 140 may update the customer profile 135 to indicate that the associated customer is a preferred customer entitling the customer to certain rates and/or benefits.

The transaction engine 145 includes any hardware, software, and/or firmware operable to identify vehicle information, identify customer information, and the automatically generate a transaction based, at least in part, on the vehicle information and customer information. A transaction may include automatically charging a credit card, generating an invoice for mailing to the customer, emailing a receipt to the customer, or any other information indicating that a payment has been may or needs to be made for the rental of vehicle 102 or otherwise providing electronic and/or paper record relating to the rental. For example, the transaction engine 145 may be operable to determine the mileage of the vehicle 102 during the customer's use and generate a transaction in accordance with the rental agreement terms. While determining the transaction, the transaction engine 145 may retrieve vehicle information from an associated vehicle profile 130 and customer information from an associated customer profile 135. After the transaction process, the transaction engine 145 may store the results in one or more customer profiles 135 associated with the customer. The transaction engine 145 may be written or described in any appropriate computer language including C, C++, Java, Visual Basic, assembler, any suitable version of 4GL, and/or others. It will be understood that while the transaction engine 145 is illustrated in FIG. 1 as a single multi-tasked module, the features and functionality performed by this engine may be performed by multiple modules such as, for example, a computation module, a transmission module, and a charging module. Further, while illustrated as internal to the system 110, one or more processes associated with the transaction engine 145 may be stored, referenced, or executed remotely. Moreover, the transaction engine 145 may be a child or sub-module of another software module (not illustrated).

In one aspect of operation, registration engine 140 receives customer information and generates a customer profile 135 based, at least in part, on the customer information. In response to a rental request, registration engine 140 associates a customer profile 135 with a vehicle profile 130. In some embodiments, registration engine 140 updates the customer profile 135 with information identifying the associated vehicle 102. During operation, control module 104 wirelessly transmits vehicle information to fob 106. As discussed above, vehicle information may include mileage, fuel tank level, and/or collision information. Upon return of the rental vehicle 102, the customer returns the keys including fob 106 to the kiosk 108. After detecting the return of the fob 106, kiosk 108 transmits a request to the fob 106 and/or retrieves vehicle information from the fob 106. In some implementations, information may be retrieved by the kiosk 109 from the fob 106 without transmitting a request, such as by having the fob 106 periodically transmit information or allowing the kiosk 108 to retrieve vehicle information written to a passive RFID chip in the fob 106. The kiosk 108 transmits at least a portion of the vehicle information to rental system 110 via network 112. The registration engine 140 updates the vehicle profile 130 with the received vehicle information. The transaction engine 145 retrieves the vehicle information from vehicle profile 130 and rental information from the associated customer profile 135. The transaction engine 145 generates a transaction based, at least in part, on the vehicle information and rental information. The transaction engine 145 may then charge the customer for the use of the rental vehicle 102 and transmit a receipt to the customer.

Figure 2:
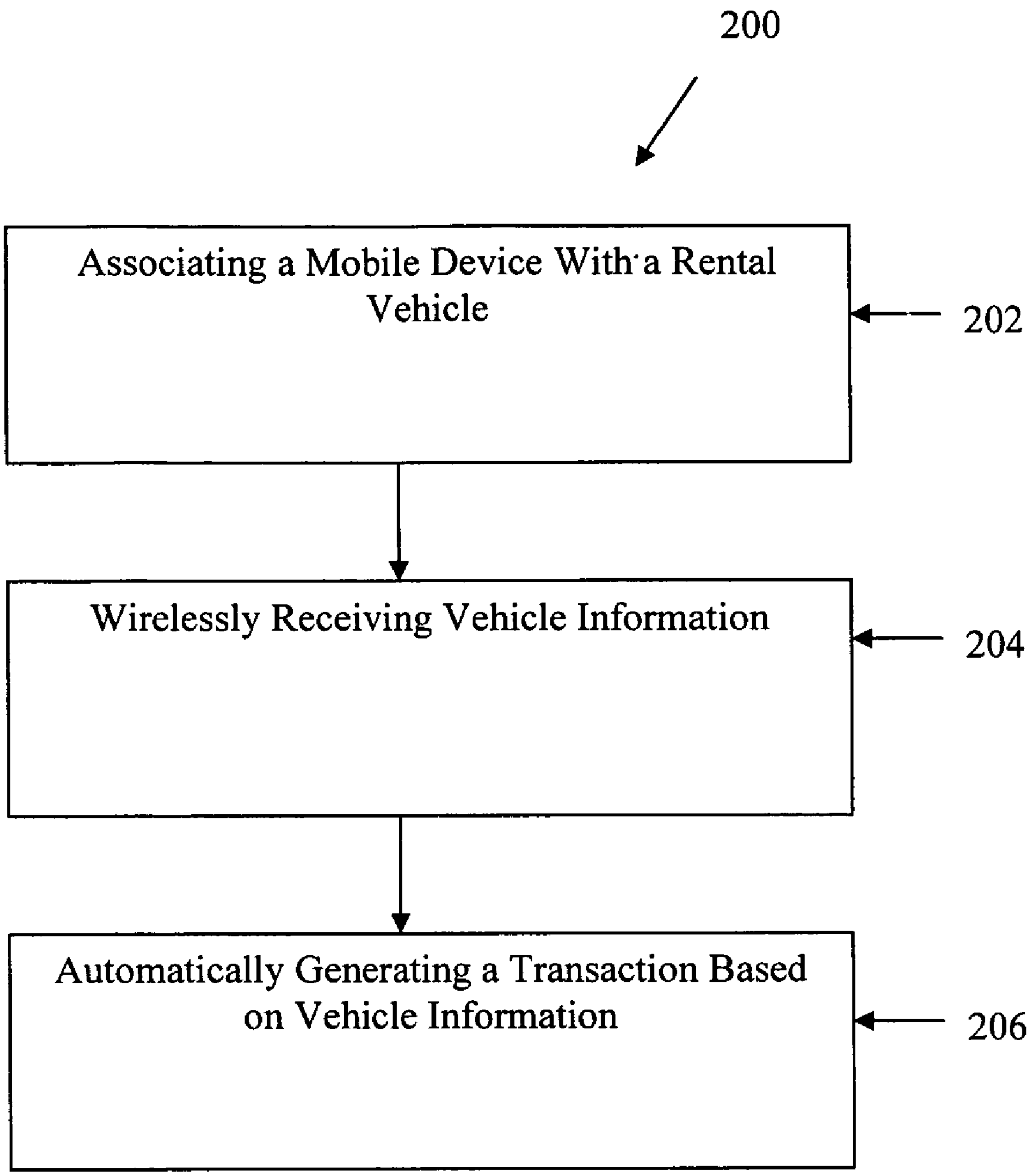
FIG. 2 illustrates an example method for managing rental vehicles of FIG. 1.
Figure 3:
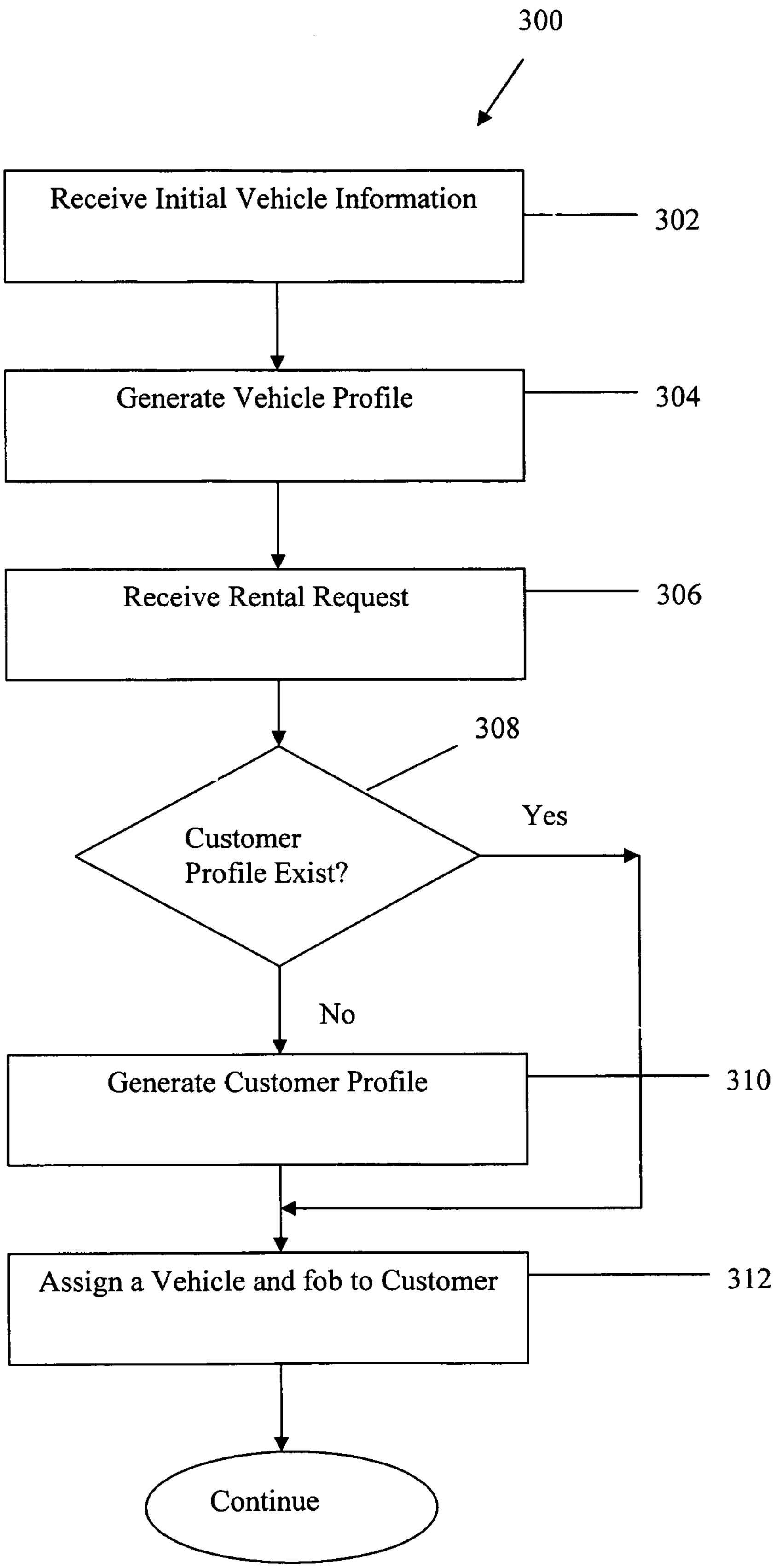
FIG. 3 illustrates another example method for managing rental vehicles of FIG. 1.
Figure 3:
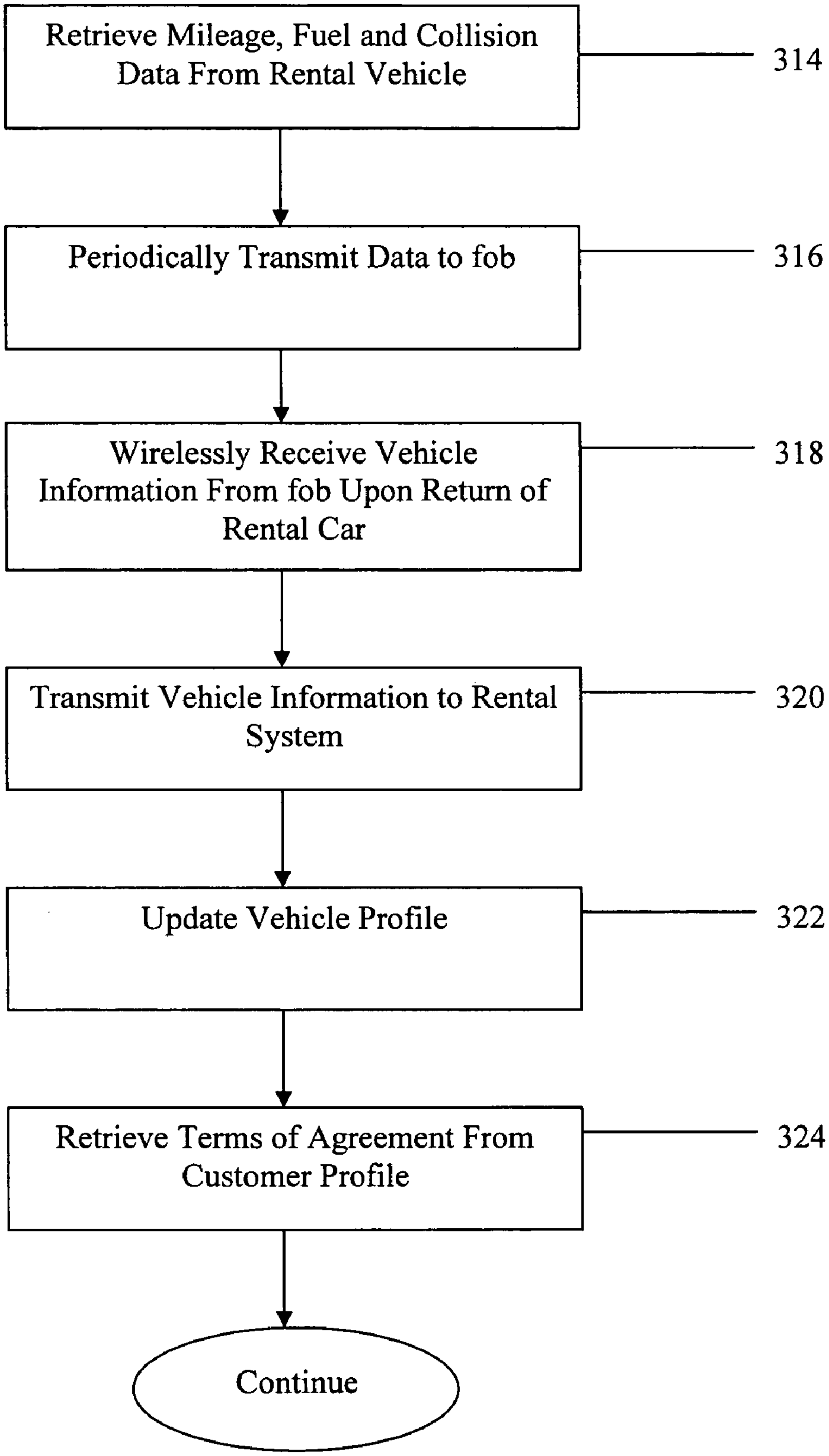
Figure 3:
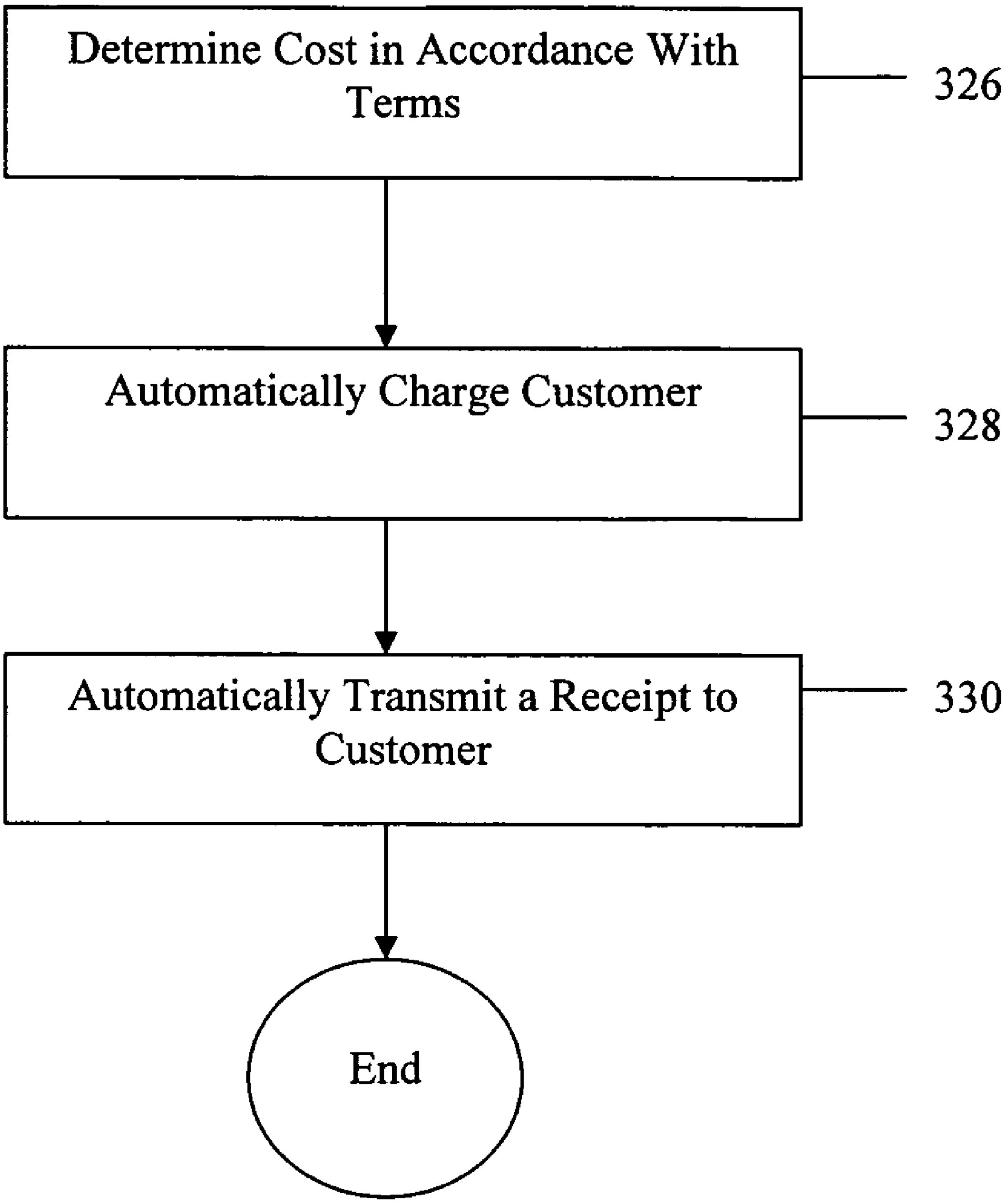

FIGS. 2 and 3 illustrate flow diagrams implementing an example process for using management system 100 of FIG. 1 to automatically generate transactions for rental vehicles 102. Processes 200 and 300 are described with respect to management system 100 of FIG. 1, but process 200 and 300 could be used by any other application or applications. Thus, many of the operations in these flow diagrams may take place simultaneously and/or in different orders as shown. Further, management system 100 may execute logic implementing techniques similar to one or both processes 200 and 300 in parallel or in sequence. Management system 100 may also use processes with additional operations, fewer operations, and/or different operations.

Referring to FIG. 2, process 200 begins at step 202 where a mobile device 106 is associated with a rental vehicle 102. For example, system 100 may assign a vehicle identifier to the mobile device 106. During the rental period, vehicle information is wirelessly transmitted to the fob 106. Next, at step 204, kiosk 108 wirelessly receives vehicle information associated with rental vehicle 102 when the fob 106 is provided to the kiosk 108. As discussed above, the vehicle information may include mileage, fuel tank level, and/or collision information. At step 206, system 110 automatically generates a transaction based, at least in part, on the vehicle information received by the kiosk 108. For example, system 100 may determine the cost of the rental services in accordance with a rental agreement and automatically charge the customer the cost.

Referring to FIG. 2, process 300 begins at step 302 where system 110 receives initial vehicle information. For example, the initial vehicle information may include make, model, year, VIN number, license plate number, and/or other information associated with the vehicle 102. In response to at least receiving the initial vehicle information, system 110 generates an associated vehicle profile 130 based, at least in part, on the initial vehicle information. In some embodiments, each vehicle profile 130 is associated with a different rental vehicle 102. At step 306, system 110 receives a rental request from a customer. The rental request may include dates, vehicle type, billing information, and/or other information associated with customer. If an associated customer profile 135 does not exist for the customer at decisional step 308, system 110 generates an associated customer profile 135 based, at least in part, on information contained in the rental request at step 310. In some embodiments, the customer profile 135 includes rental terms for the customer. If the customer profile 135 exists for the customer, then execution proceeds to step 312, at which system 110 assigns a rental vehicle 102 and an associated fob 106 to the customer. In some embodiments, the assignment may include storing a customer identifier in the associated vehicle profile 130, storing the vehicle identifier in the associated customer profile 135, storing a customer identifier in the fob 106, and/or other suitable methods for associating the customer with the vehicle 102. After the customer profile 135 and the vehicle profile 130 are generated and associated, system 100 is ready to automatically generate a transaction based on vehicle information.

At step 314, the module 104 retrieves mileage, fuel, and collision data from the rental vehicle 102. The module 104 periodically transmits the retrieved data to the fob 106 at step 316. Upon return of the rental vehicle 102, the filed 106 wirelessly transmits information to the kiosk 108 at step 318, and, at step 320, the kiosk 108 transmits the vehicle information to the system 110. The registration engine 140 updates the associated vehicle profile 130 with the received vehicle information. Next, the transaction engine 145 generates a transaction in accordance with rental agreement terms included in the customer profile 135.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Although systems and techniques have been described in terms of certain embodiments and generally associated methods, alterations, and permutations of these embodiments and methods will be apparent to those skilled in the art. Accordingly, the above description of example embodiments does not define or constrain the scope of the invention. Other changes, substitutions, and alterations are also possible without departing from the spirit and scope of the following claims.

What is claimed is:

1. A method for managing rental vehicles, the method comprising:

associating a key fob with a rental vehicle, the key fob connected to a key chain for the rental vehicle and operable to wirelessly receive vehicle information from the associated rental vehicle;

wirelessly receiving from the key fob vehicle information in response to a customer returning the key chain and the connected key fob to a kiosk;

identifying terms of agreement associated with the customer renting the rental vehicle automatically executing, independent of a rental company employee and the customer, a transaction with an account of the customer based, at least in part, on the vehicle information and the terms of agreement associated with the customer; and automatically transmitting a receipt of the executed transaction to the customer.

2. The method of claim 1, wherein the vehicle information comprises at least one of vehicle identification, vehicle mileage, fuel level, or collision information.

3. The method of claim 1, further comprising periodically transmitting vehicle information to the mobile device in accordance with a time period.

4. The method of claim 1, further comprising transmitting a request to the wireless device in response to the customer providing the wireless device to the kiosk.

5. The method of claim 1, further comprising automatically generating a receipt in accordance with the transaction.

6. The method of claim 5, wherein the receipt is in an electronic format.

7. A tangible article comprising a machine-readable medium storing instructions for causing data processing apparatus to perform operations comprising:

associating a key fob with a rental vehicle, the key fob connected to a key chain for the rental vehicle and operable to wirelessly receive vehicle information from the associated rental vehicle;

wirelessly receiving from the key fob vehicle information in response to a customer returning the key chain and the connected key fob to a kiosk;

identifying terms of agreement associated with the customer renting the rental vehicle automatically executing, independent of a rental company employee and the customer, a transaction with an account of the customer based, at least in part, on the vehicle information and the terms of agreement associated with the customer; and automatically transmitting a receipt of the executed transaction to the customer.

8. The article of claim 7, wherein the vehicle information comprises at least one of vehicle identification, vehicle mileage, fuel level, or collision information.

9. The article of claim 7, the operations further comprising periodically transmitting vehicle information to the mobile device in accordance with a time period.

10. The article of claim 7, the operations further comprising transmitting a request to the wireless device in response to the customer providing the wireless device to the kiosk.

11. The article of claim 7, the operations further comprising automatically generating a receipt in accordance with the transaction.

12. The article of claim 11, wherein the receipt is in an electronic format.

13. A kiosk, comprising:

a receiving element operable to receive keys for a rental vehicle and a key fob connected to an associated key chain, the connected key fob associated with the rental vehicle;

a first transmitter operable to transmit a request for vehicle information to the key fob in connection with a customer depositing the keys and the connected key fob with the kiosk;

a receiver operable to wirelessly receive vehicle information from the mobile device; and a second transmitter operable to transmit, independent of a rental company employee and the customer, the vehicle information to a network element for automatically generating a transaction associated with the rental vehicle using the vehicle information.

* * * * *

UNITED STATES PATENT AND TRADEMARK OFFICE

CERTIFICATE OF CORRECTION

PATENT NO. : 7,761,062 B2

APPLICATION NO. : 11/259470

DATED : July 20, 2010

INVENTOR(S) : John C. Mervine

It is certified that error appears in the above-identified patent and that said Letters Patent is hereby corrected as shown below:

In column 8, line 56, in Claim 1, after "vehicle" insert -- ; --.

In column 9, line 24, in Claim 7, after "vehicle" insert -- ; --.

Signed and Sealed this

Sixteenth Day of November, 2010

David J. Kappos

*Director of the United States Patent and Trademark Office*